US007843157B2

(12) United States Patent
Archer et al.

(10) Patent No.: US 7,843,157 B2
(45) Date of Patent: Nov. 30, 2010

(54) METHODS AND APPARATUS FOR PROVIDING MOTOR CONTROL SIGNALS

(75) Inventors: William A. Archer, Ft. Wayne, IN (US); Brian L. Beifus, Ft. Wayne, IN (US); Kamron Mark Wright, Ft. Wayne, IN (US)

(73) Assignee: Regal Beloit Company, Beloit, WI (US)

( * ) Notice: Subject to any disclaimer, the term of this patent is extended or adjusted under 35 U.S.C. 154(b) by 926 days.

(21) Appl. No.: 11/427,977

(22) Filed: Jun. 30, 2006

(65) Prior Publication Data

US 2008/0122392 A1    May 29, 2008

(51) Int. Cl.
*H02P 27/00* (2006.01)
(52) U.S. Cl. .................. 318/504; 713/300; 713/310
(58) Field of Classification Search .......... 318/504, 318/108; 713/300, 310
See application file for complete search history.

(56) References Cited

U.S. PATENT DOCUMENTS

| | | | | |
|---|---|---|---|---|
| 5,805,903 A | * | 9/1998 | Elkhoury | 713/300 |
| 5,832,244 A | * | 11/1998 | Jolley et al. | 710/305 |
| 6,013,876 A | * | 1/2000 | Caporizzo | 174/262 |
| 6,054,822 A | * | 4/2000 | Harada | 318/434 |
| 6,149,319 A | * | 11/2000 | Richter et al. | 713/300 |
| 6,295,210 B1 | * | 9/2001 | Lanzone et al. | 361/799 |
| 6,297,612 B1 | * | 10/2001 | Shloush et al. | 318/569 |
| 6,456,023 B1 | | 9/2002 | Becerra et al. | |
| 6,604,228 B1 | * | 8/2003 | Patel et al. | 716/8 |
| 6,690,590 B2 | * | 2/2004 | Stamenic et al. | 363/89 |
| 6,983,385 B2 | * | 1/2006 | German et al. | 713/300 |
| 7,263,457 B2 | * | 8/2007 | White et al. | 702/132 |

* cited by examiner

*Primary Examiner*—Walter Benson
*Assistant Examiner*—David S Luo
(74) *Attorney, Agent, or Firm*—Armstrong Teasdale LLP

(57) ABSTRACT

A method for providing a compatible interface between a motor control circuit and a system controller is described. The method includes determining which signals in the interface have incompatible voltage requirements, and inserting a series resistance in an interface extending between the motor control circuit and the system controller for each signal determined to have incompatible voltage requirements therebetween.

16 Claims, 2 Drawing Sheets

METHODS AND APPARATUS FOR PROVIDING MOTOR CONTROL SIGNALS

BACKGROUND OF THE INVENTION

This invention relates generally to control of motor operations, and more specifically, to methods and apparatus for providing motor control signals.

Electronically controlled variable speed motors (VSMs), including electronically commutated motors (ECMs) and induction motors are generally used in air handling (blowers, fans) applications in HVAC (Heating, Ventilation, Air Conditioning) systems. The controllers (e.g., circuit boards) that are utilized in many of these HVAC systems generally switch 115 VAC (furnace) or 230 VAC (air handler, heat pump) voltages for control of the motors operation. These switched voltages are applied to the taps of induction motors to invoke different speeds of operation for the induction motor. Heating, cooling, and continuous fan modes of operation may all be a different speed (motor tap). Installations with higher or lower static pressure, due to restrictions in the ductwork and filters, may require additional choices.

In systems where VSMs are utilized instead of induction motors, VSM operational selections are typically made with 24 VAC signals that are available in most systems or even with low voltage DC signals developed on the systems control board. To minimize the changes required by an OEM (Original Equipment Manufacturer) to their system controllers when changing from a standard induction motor to a VSM, a way to accommodate the switching and application of the high voltage signals to be compatible with the low voltage signal inputs of the VSM is needed. While active interfaces are known to interface controllers to VSMs, a passive inexpensive solution would also be desirable.

BRIEF DESCRIPTION OF THE INVENTION

In one aspect, a method for providing a compatible interface between a motor control circuit and a system controller is provided. The method comprises determining which signals in the interface have incompatible voltage requirements, and inserting a series resistance in an interface extending between the motor control circuit and the system controller for each signal determined to have incompatible voltage requirements therebetween.

In another aspect, an interface for utilization between a system controller and a controller for an electronically controlled variable speed motor (VSM) is provided. The interface includes a first plurality of conductors each configured to directly connect an output of the system controller to a corresponding input of the VSM controller, and a second plurality of conductors. Each of the second plurality of conductors includes a series resistor therein, and each of the second plurality of conductors is configured to connect an output of the system controller which operates at a first voltage level through the corresponding resistor to an input of the VSM controller that operates at a second voltage level, where the second voltage level is lower than the first voltage level.

In still another aspect, a system for controlling an electronically controlled variable speed motor (VSM) including an VSM controller is provided. The system includes a system controller, and an interface electrically coupling the system controller to the VSM controller. The interface includes a first plurality of conductors each configured to directly connect an output of the system controller to a corresponding input of the VSM controller, and a second plurality of conductors each comprising a series resistor therein. Each of the second plurality of conductors is configured to connect an output of the system controller, which operates at a first voltage level, to an input of the VSM controller, that operates at a second voltage level through the resistor. The second voltage level is lower than the first voltage level.

DETAILED DESCRIPTION OF THE INVENTION

Figure 1:
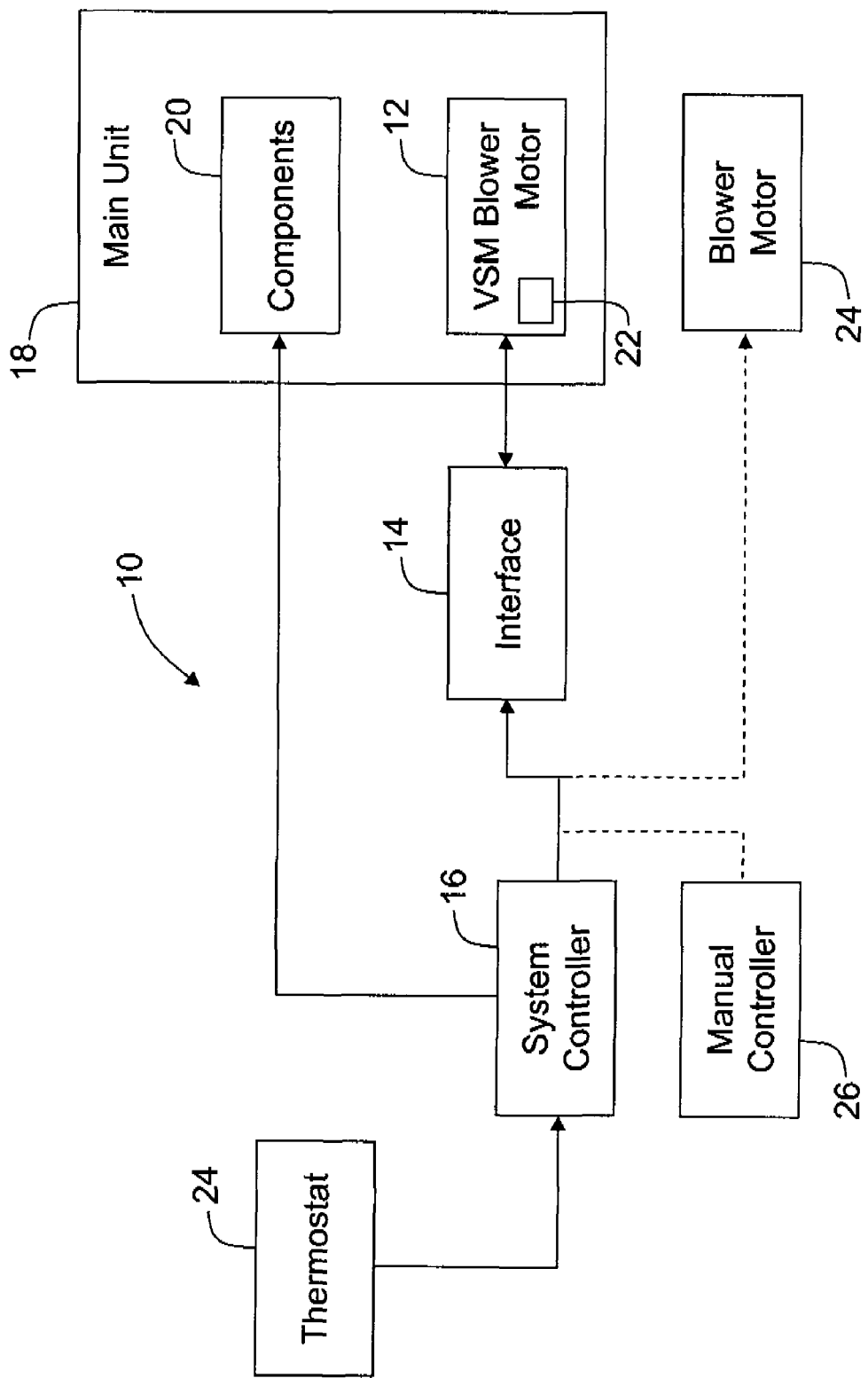
FIG. 1 is a block diagram of an air moving control system including an interface between a system controller and an electronically controlled variable speed motor (VSM).

FIG. 1 is a block diagram of an air moving control system 10 used to control an electronically controlled variable speed motor (VSM) 12. One example of such a motor is an electronically commutated motor (ECM). System 10 is an air moving control system, such as a residential heating, ventilation and air conditioning (HVAC) control system, a light commercial HVAC control system, or a clean room filtering control system. System 10 includes an interface 14 providing an electrical coupling between a system controller 16, for example a HVAC system controller, and a main unit 18, for example a HVAC unit. Main unit 18 includes components 20 and VSM 12. In one embodiment, VSM 12 is a blower motor. Motor 12 includes a motor controller 22 including a microprocessor (not shown) and a memory (not shown) containing an VSM program. Specifically, interface 14 provides connection of signals between system controller 16 and motor controller 22.

System controller 16 is connected to a thermostat 24 that includes a plurality of settings, or modes, such as low heat, high heat, cooling, dehumidify, and continuous fan. Additionally, thermostat 24 measures a temperature in a predetermined space or location and transmits an electrical signal representing the measured temperature to controller 16. Controller 16 controls main unit 18 via interface circuit 14. Interface 14 receives control signals in the form of input voltage signals from system controller 16 and provides signals suitable for controlling operation of VSM 12. In one known application, interface 14 includes active circuitry for interfacing the signals of system controller 16 with those of VSM 12 (and motor controller 22). The translated signals are transmitted to blower motor 12, and the torque, speed, or air flow of blower motor 12 is varied in accordance with the adjusted voltage outputs.

In an alternative embodiment, interface 14 is not electrically connected to thermostat 24, but rather electrically connected to a manual controller 26 and an additional blower motor 28. When manual controller 26 and blower motor 28 are connected to interface 14, a user is able to selectively operate blower motor 12 using an on/off switch. In such an embodiment, system controller 16 does not control blower motor 12 operation.

In one embodiment of the present invention interface 14 does not include active circuitry. Rather, and as described in additional detail below, interface 14 simply includes one or more series resistors to reduce the voltage levels of signals originating at system controller 16 to be compatible with motor controller 22 of VSM 12. More specifically, in various embodiments, system controller 16 may provide signals substantially equal to 115 VAC or 230 VAC and the resistors within interface 14 are of a resistance such that the signals are reduced to be approximately 24 VAC at motor controller 22.

Figure 2:
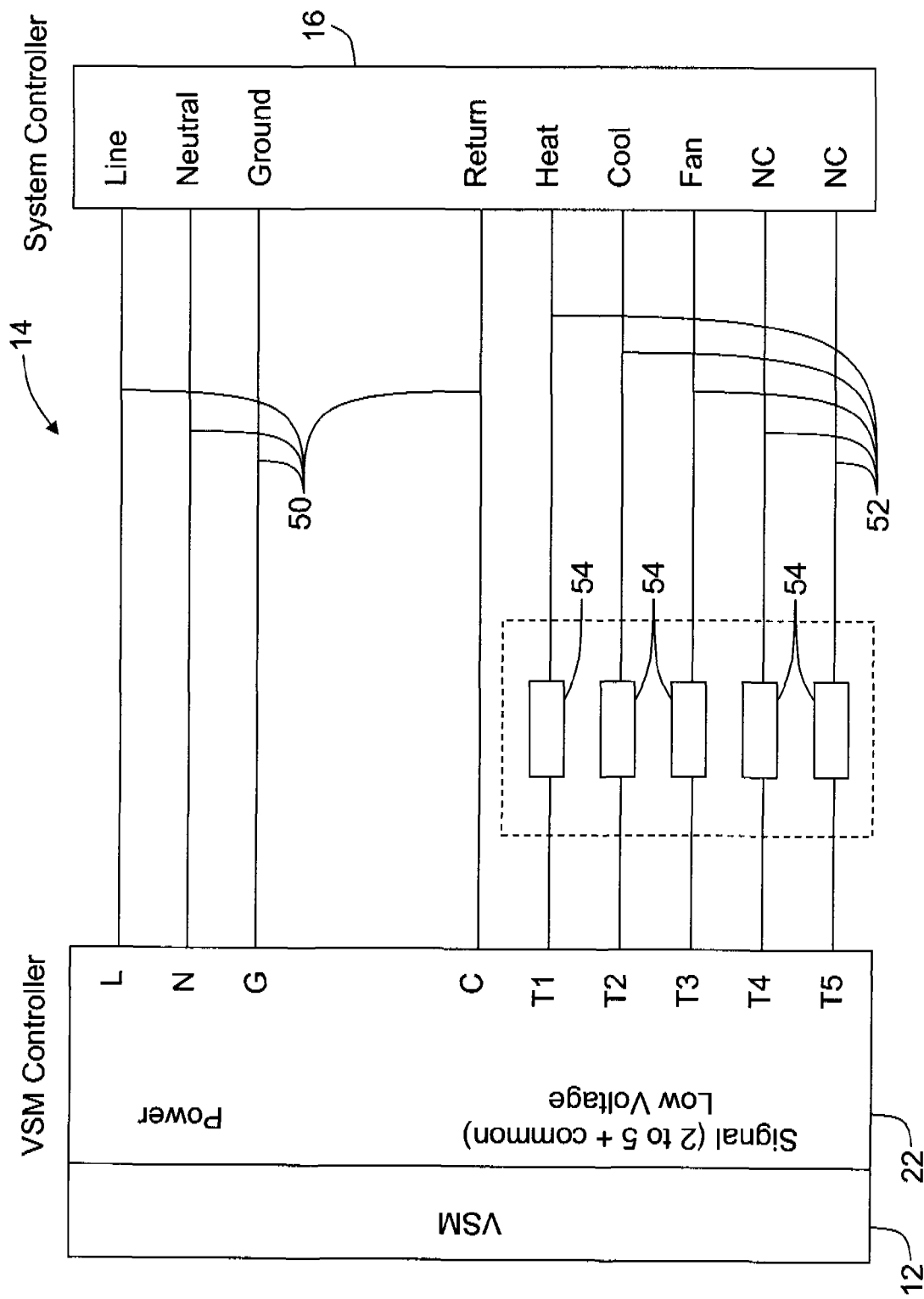
FIG. 2 is a schematic diagram of a passive interface for utilization between a VSM and a system controller.

FIG. 2 is a schematic diagram of one embodiment of a passive interface 14 for utilization between a VSM controller 22 (coupled to VSM 12) and a system controller 16. Interface 14 includes a first set of conductors 50 that provide direct connections between system controller 16 and VSM controller 22. Conductors 50 provide, for example and as illustrated, power connections for VSM controller 22, specifically, LINE, NEUTRAL, and GROUND connections. Another conductor 50 provides a return signal path for the control signals described below. A return signal is also sometimes referred to as a common.

As described above, various air moving control system functions utilize different motor speeds. The embodiment of VSM controller 22 illustrated in FIG. 2 includes a number of motor tap signals, T1, T2, T3, T4, and T5, which, depending on the signals applied thereto, dictate one or more operational characteristics of VSM 12. Corresponding signals at system controller 16 include HEAT, COOL, FAN, and may include others not shown in FIG. 2, for example a second FAN speed or a second COOLing speed. The embodiment of system controller 16 shown in FIG. 2 does not include any secondary signals and these are illustrated as no connect or NC.

Interface 14, in the embodiment illustrated, includes a plurality of conductors 52 that connect the motor tap signals at VSM controller 22 to the corresponding signals at system controller 16. Each conductor 52 of interface 14 includes a series resistor 54 which operates to, for example, drop the 115 VAC HEAT signal output by system controller 16 to an approximate 24 VAC level which can be utilized by VSM controller 22. Motor tap signals at VSM controller 22 are sometimes referred to as selection lines.

Interface 14 includes a resistor 54 in series with each of the selection lines (or the common (neutral) line in an alternative embodiment) of VSM controller 22 that are used for controlling the VSM. In various alternative embodiments, resistors 54 are part of a wiring harness and are either mounted on a separate circuit board assembly or are added at one of VSM controller 22 or system controller 16.

In specific embodiments, for interfacing a nominal 230 VAC signal from system controller 16 to VSM controller 22, an approximately 22K ohm, 5 watt resistor is utilized for each selection line, while for interfacing a nominal 115 VAC signal from system controller 16 to VSM controller 22, an approximately 10K ohm, 2 watt resistor is utilized for each selection line. These resistance values provide acceptable drive levels to VSM controller 22 and an acceptable power dissipation rating, at least for the common 115 VAC and 230 VAC signals typically found at system controllers.

The low voltage interface of VSM controller 22 is a valid and often preferred way to interface with external circuits that are configured to operate with 24 VAC signals. Therefore incorporating resistors internal to VSM controller 22 is not desirable because such a VSM controller would no longer be able to interface to system controllers and thermostats that utilize nominal 24 VAC signals. Additionally, when referring to the 115 VAC and 230 VAC system controllers described herein, resistors within VSM controller 22 are also undesirable because the power dissipated by the plurality of resistors can increase the internal ambient temperature for the control electronics within VSM controller 22 and the high voltage that would need to be input to VSM controller 22 would require safety agency spacing criteria to be met therein, thereby increasing the overall physical dimensions of VSM controller 22. Additionally, incorporating resistors within a VSM controller would increase the cost.

Incorporating resistors 54 into a harness assembly, or other embodiment of interface between VSM controller 22 and system controller 16, minimizes the changes required to either complex electronic assembly. When needed, a different harness assembly (relatively lower cost) can be incorporated into the air moving system, for example, should a change from a VSM to an induction motor occur. Utilization of interface 14 is likely the lowest cost solution for an OEM that has a high mix of products, since it minimizes the inventory of higher cost items such as active interfaces between system controllers and VSM controllers or version of either that are specifically modified for direct connections therebetween.

Interface 14, as described herein, provides a high voltage interface technique compatible with low voltage circuitry through use of a resistor in series with each of the I/O (Input/Output) (selection) lines to drop voltage. Interface 14 therefore allows a voltage higher than the motor controller (VSM controller 22) is rated for to be used to select operating modes for the motor.

While the invention has been described in terms of various specific embodiments, those skilled in the art will recognize that the invention can be practiced with modification within the spirit and scope of the claims.

What is claimed is:

1. A passive interface for utilization between a system controller and a variable speed motor (VSM) controller for an electronically controlled VSM, said passive interface comprising:
   a first plurality of conductors, each conductor in said first plurality of conductors configured to directly connect an output of the system controller to a corresponding input of the VSM controller, said first plurality of conductors configured to provide an operating power to the VSM controller; and
   a second plurality of conductors, each conductor in said second plurality of conductors separately connecting a signal output of the system controller to a respective input of the VSM controller, each conductor in said second plurality of conductors comprising a series resistor therein for passively reducing a voltage level of signals originating at the system controller, each series resistor comprising an electrical resistance that corresponds to a predefined voltage level of the respective input of the VSM controller.

2. A passive interface according to claim 1 wherein at least one of said series resistors comprises a resistance value capable of interfacing a nominal 115 VAC signal from the system controller to a nominal 24 VAC level at the VSM controller.

3. A passive interface according to claim 1 wherein at least one of said series resistors comprises a resistance value capable of interfacing a nominal 230 VAC signal from the system controller to a nominal 24 VAC level at the VSM controller.

4. A passive interface according to claim 1 wherein at least one of said series resistors comprises a resistance value to interface a signal originating from the system controller to a corresponding motor tap signal input at the VSM controller.

5. A passive interface according to claim 1 wherein said second plurality of conductors comprises one or more of a wiring harness including said resistors, a separate circuit board assembly incorporated into said interface onto which said resistors are mounted, said resistors installed between a wiring harness and the VSM controller, and said resistors installed between a wiring harness and the system controller.

6. A passive interface according to claim 1 wherein said second plurality of conductors comprises a return line extending between the system controller and the motor control circuit, wherein one of said resistors is configured to provide a series resistance in said return line.

7. A passive interface according to claim 1 wherein said second plurality of conductors is positioned external to the system controller and the VSM controller.

8. A system for controlling an electronically controlled variable speed motor (VSM) including a motor controller, said system comprising:
   a system controller; and
   a passive interface electrically coupling said system controller to the motor controller, said passive interface comprising:
      a first plurality of conductors each configured to directly connect an output of said system controller to a corresponding input of the motor controller, said first plurality of conductors configured to provide an operating voltage to the motor controller; and
      a second plurality of conductors each comprising a series resistor therein for passively reducing a voltage level of signals originating at said system controller, each of said second plurality of conductors configured to connect a signal output of said system controller to a respective input of the motor controller, each series resistor comprising an electrical resistance that corresponds to a predefined voltage level of the respective input of the motor controller.

9. A system according to claim 8 wherein at least one of said series resistors comprises a resistance value capable of interfacing a nominal 115 VAC signal from said system controller to a nominal 24 VAC level at the motor controller.

10. A system according to claim 8 wherein at least one of said series resistors comprises a resistance value capable of interfacing a nominal 230 VAC signal from said system controller to a nominal 24 VAC level at the motor controller.

11. A system according to claim 8 wherein at least one of said series resistors comprises a resistance value to interface a signal originating from said system controller to a corresponding motor tap signal input at the motor controller.

12. A system according to claim 8 wherein said second plurality of conductors and the corresponding series resistors comprise:

a resistor having a resistance value to interface a HEAT signal originating from said system controller to a corresponding motor tap signal input at the motor controller;
   a resistor having a resistance value to interface a COOL signal originating from said system controller to a corresponding motor tap signal input at the motor controller; and
   a resistor having a resistance value to interface a FAN signal originating from said system controller to a corresponding motor tap signal input at the motor controller.

13. A system according to claim 8 wherein second plurality of conductors and the corresponding series resistors comprise:
   at least one nominal 10 Kohm, two Watt resistor for reducing a nominal 115 VAC signal from said system controller to a nominal 24 VAC level at the motor controller; and
   at least one nominal 22 Kohm, five Watt resistor for reducing a nominal 230 VAC signal originating from said system controller to a nominal 24 VAC level at the motor controller.

14. A system according to claim 8 wherein said second plurality of conductors comprises one or more of a wiring harness including said resistors, a separate circuit board assembly incorporated into said interface onto which said resistors are mounted, said resistors installed between a wiring harness of said interface and the motor controller, and said resistors installed between a wiring harness of said interface and said system controller.

15. A system according to claim 8 wherein said second plurality of conductors comprises a return line extending between said system controller and the motor controller, one of said resistors configured to provide a series resistance in said return line.

16. A system according to claim 8 wherein said passive interface is positioned external to said system controller and the motor controller.

* * * * *